US012432203B2

(12) United States Patent
Douglas et al.

(10) Patent No.: US 12,432,203 B2
(45) Date of Patent: Sep. 30, 2025

(54) SYSTEMS AND METHODS FOR DIGITAL MEDIA-BASED USER AUTHENTICATION

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 165 days.

(21) Appl. No.: 18/496,820

(22) Filed: Oct. 27, 2023

(65) Prior Publication Data

US 2025/0141867 A1 May 1, 2025

(51) Int. Cl.
*H04L 9/40* (2022.01)

(52) U.S. Cl.
CPC ...... *H04L 63/0861* (2013.01); *H04L 63/1433* (2013.01)

(58) Field of Classification Search
CPC .................. H04L 63/0861; H04L 63/1433
USPC ............................................................. 726/5
See application file for complete search history.

(56) References Cited

U.S. PATENT DOCUMENTS

| | | | | |
|---|---|---|---|---|
| 10,148,631 | B1* | 12/2018 | Sokolov | H04W 12/65 |
| 11,310,229 | B2* | 4/2022 | Khanka | G06F 21/32 |
| 11,914,690 | B2* | 2/2024 | Popa | H04L 63/0861 |
| 12,093,945 | B2* | 9/2024 | Ridzuan Bin Ma Arof | G06Q 20/4016 |
| 2011/0231911 | A1* | 9/2011 | White | G06F 21/32 726/7 |
| 2017/0372056 | A1* | 12/2017 | Narasimhan | G06F 21/32 |
| 2018/0047397 | A1* | 2/2018 | Grover | G10L 17/06 |
| 2019/0197220 | A1* | 6/2019 | Anderson | G06Q 10/0635 |
| 2019/0253883 | A1* | 8/2019 | Aylward | G06F 3/0304 |
| 2020/0004939 | A1* | 1/2020 | Streit | G06F 21/316 |
| 2020/0019679 | A1* | 1/2020 | Asghari-Kamrani | G06Q 20/4014 |
| 2020/0344225 | A1* | 10/2020 | Parry | G06V 40/70 |
| 2021/0166241 | A1* | 6/2021 | Woo | G06V 40/172 |
| 2023/0247030 | A1* | 8/2023 | Chaudhary | G06V 10/764 726/6 |
| 2023/0325481 | A1* | 10/2023 | Clay | G06V 40/20 726/17 |

FOREIGN PATENT DOCUMENTS

CN 114826709 A 7/2022

OTHER PUBLICATIONS

Extended European Search Report on EP Appl. Ser. No. 24207637.0 Dated Mar. 26, 2025 (8 pages).

* cited by examiner

*Primary Examiner* — Dant B Shaifer Harriman
(74) *Attorney, Agent, or Firm* — Foley & Lardner LLP

(57) ABSTRACT

Systems and methods for digital media-based user authentication are disclosed herein. In some aspects, the system may receive an authentication request. The system may transmit a user verification request based on the authentication request. The system may receive media recordings in response to the user verification request. The system may detect one or more features in the media recordings. The system may generate a plurality of risk metrics for the user based on generating risk metrics for the one or more features. The system may determine an authentication probability based on the plurality of risk metrics.

20 Claims, 5 Drawing Sheets

| Model Identifier 212 | Risk Metric 214 |
|---|---|
| Model 1A | 85/100 |
| Model 1B | 5/100 |
| Model 2A | 79/100 |
| Model 2B | 2/100 |
| Model 2C | 97/100 |

| Authentication Probability 220 | 23% |
|---|---|

| Recording 142 | Detected Feature 144 | Detection Timestamp 146 | Feature Classification 148 |
|---|---|---|---|
| Video A | User | 2023-05-07T16:45Z | Person |
| | Bicycle | 2023-05-07T16:45Z | Background Object |
| | Window | 2023-05-07T16:45Z | Background Object |
| | Ray of Light | 2023-05-07T16:45Z | Background Light |
| Audio A | Spoken Sentence | 2023-05-07T16:52Z | Human Speech |
| | Traffic sounds | 2023-05-07T16:45Z | Background Noise |
| Video B | User | 2023-05-07T17:03Z | Person |
| | Window | 2023-05-07T17:03Z | Background Object |
| | Ray of Light | 2023-05-07T17:03Z | Background Light |
| Audio B | White Noise | 2023-05-07T17:03Z | Human Speech |

| Model Identifier 210 | Risk Metric 214 |
|---|---|
| Model 1A | 85/100 |
| Model 1B | 5/100 |
| Model 2A | 79/100 |
| Model 2B | 2/100 |
| Model 2C | 97/100 |

| Authentication Probability 220 |
|---|
| 23% |

FIG. 2B

| Model Identifier 202 | Model Classification 204 |
|---|---|
| Model 1A | Background Noise |
| Model 1B | Human Speech |
| Model 2A | Background Object |
| Model 2B | Human Image |
| Model 2C | Background Light |
| Model 3A | Textual Sentiment Analysis |

FIG. 2A

SYSTEMS AND METHODS FOR DIGITAL MEDIA-BASED USER AUTHENTICATION

SUMMARY

Methods and systems are described herein for authenticating users based on digital media-based security factors. For example, the system may evaluate digital images, videos, or audio data associated with a user during authentication. The system may generate risk metrics based on features detected within the media over time. As an illustrative example, the system may detect a background noise in a first audio recording of the user but fail to detect the same background noise in a second audio recording. By evaluating a measure of risk associated with a disappearing background noise, the system may determine a corresponding probability that one of the audio recordings is artificially generated (e.g., through an AI engine), thereby improving the system's ability to determine an authorization status for the user.

Existing systems may authenticate a user based on user credentials stored by the system upon the user's initial registration. For example, upon a request from a user to access an electronic resource such as a secure cloud server, a conventional system may transmit an authentication challenge requesting a username and password associated with the user to validate that the request originated from an authorized user. In some cases, an authentication challenge may include a request for a photo or other identification of the user, such as a driver's license or identification card. Conventional systems may verify whether any details, photos, or information provided by the user matches stored information provided by the user in the past, thereby enabling authentication of the user. However, such conventional systems can fall prey to malicious attacks or hacking by external parties. For example, malicious entities may steal authentication credentials and deceitfully present an authorized user's credentials without the user's knowledge or consent. As an illustrative example, a malicious entity may acquire a photo of the user and submit the photo in response to an authentication challenge as proof of the presence of the authorized user. Even in more complex authentication challenges (e.g., involving videos or audio of the user's speech), malicious entities may acquire corresponding videos or audio of the authorized user and present this data as contemporaneous proof of the user's presence to deceive the authentication system. As such, conventional systems may be tricked or bypassed, thereby weakening the security of the underlying system to be accessed.

To overcome these technical deficiencies in conventional authentication systems, methods, and systems disclosed herein leverage media recordings over different times to evaluate whether a user submitting such recordings corresponds to the authorized user. For example, the system may request multiple audio or video recordings of the user over different times and evaluate attributes or features associated with the recordings, such as background noises, objects, or natural light, in order to determine the probability that a given recording is authentic. As an illustrative example, the system disclosed herein may request multiple video recordings of an authorized user over different times and detect objects in the scene of the video, such as windows, objects, or natural light. For example, using artificial intelligence models, the system may evaluate whether these objects are consistent with the user or whether these objects are consistent across the requested video recordings. In some implementations, the system may detect a direction of sunlight through a window in the background of the video and evaluate whether this direction is consistent with a user's stated or measured location and recording device orientation. Thus, the system may generate risk metrics associated with the media recordings for each feature or object detected within the videos, based on a corresponding risk determination model (e.g., artificial intelligence model). Based on these risk metrics, the system may generate a probability that the entity claiming to be the authorized user is indeed the authorized user. As such, the system enables quantification of a user's authenticity based on peripheral information relating to digital media submitted by the user, thereby providing computing systems with improved authentication and security. Thus the system enables mitigation against complex security breaches and associated losses, such as loss of data.

In some aspects, the system may receive an authentication request from a user device. For example, the system may receive, from a user device associated with a user, an authentication request, wherein the user device is configured to record media content associated with the user. For example, the system may receive a request from a user to access a cloud computing system, including any secure data previously stored by the user on the cloud. By receiving a request from a user, the system may determine whether the user is authorized to access the system (e.g., whether the user is indeed the claimed authorized user).

In some aspects, the system may transmit a user verification request requiring submission of media recordings of the user. For example, based on the authentication request, the system may transmit a user verification request to the user device, wherein the user verification request indicates a request for media recordings of the user. As an illustrative example, the system may request that a user of a cloud computing system provide audio or video recordings of themselves (e.g., through the camera of a smartphone/mobile device) for comparison with prior information relating to the user. By doing so, the system may receive live information relating to the user to improve the accuracy of user authentication beyond provision of user credentials or still images of the user.

In some aspects, the system may receive the user's media recordings in response to the user verification request. For example, the system may receive one or more media recordings from the user device in response to the user verification request. As an illustrative example, a user may record a video and/or audio recording in response to any requirements specified by the user verification request, such as a video of their face and room or, additionally or alternatively, a recording of their voice. The user may submit the recording to the system (e.g., using a mobile application on the user device) in order to complete the verification request. By doing so, the system enables the user to provide proof of their presence to aid in authentication of the user, thereby enabling the system to maintain the system secure and accessible only to authorized users.

In some aspects, the system may detect features in the user's submitted media recordings. For example, the system may detect one or more features in the one or more media recordings, wherein each feature of the one or more features is associated with a corresponding risk factor for user authentication. As an illustrative example, the system may utilize image recognition to detect objects or features in the background of any submitted videos, such as any paintings, windows, or furniture in the background of the video. For example, if the user submitted multiple videos (e.g., from multiple periods of time), the system may detect features in each video to determine whether these features are consistent across any and all recordings provided. By doing so, the system may detect situations where submitted media is artificially generated or stolen from previously recorded content, thereby improving the accuracy and sensitivity of the system to malicious attempts to access the system.

In some aspects, the system may generate risk metrics corresponding to features detected by the system. For example, the system may generate a plurality of risk metrics for the user. The system may generate the risk metrics by determining risk determination models corresponding to detected features and providing the associated media recordings to the risk determination models. By generating risk metrics corresponding to features detected in the media recordings, the system may evaluate the manner in which a given feature may affect the likelihood that a user is not as claimed. For example, if the system detects an object in a first video recording but not in a second video recording shortly thereafter, the system may determine that there is a significant chance that one of the two videos is a pre-recorded, asynchronous recording rather than a live recording of the user. As such, the system may capture situations where an authorized user of a cloud computing system is not present, thereby enabling improved sensitivity to malicious system attacks.

In some aspects, the system may generate an authentication probability based on the plurality of risk metrics. For example, the authentication probability may indicate a likelihood that the one or more media recordings correspond to the user. For example, based on the variety of features extracted from audio or video recordings submitted by the user, the system may determine whether the corresponding risk metrics indicate a likelihood that the user requesting access to the system is malicious or not in fact the authorized user claimed in the authentication request. As such, the system may further take action to deny access to the system, request more authentication information from the user, and/or investigate the user further. As such, the system disclosed herein may improve the security of cloud computing systems based on dynamic evaluation of digital media submitted by the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1C depicts a data structure describing detected features within video and audio recordings of a user, in accordance with one or more embodiments.

FIG. 2A illustrates risk determination models capable of evaluating the risk associated with authenticating a user based on features detected within media recordings of the user, in accordance with one or more embodiments.

FIG. 2B illustrates risk metrics generated by risk determination models based on features detected within media recordings, as well as a corresponding authentication probability, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figures 1A, 1B:
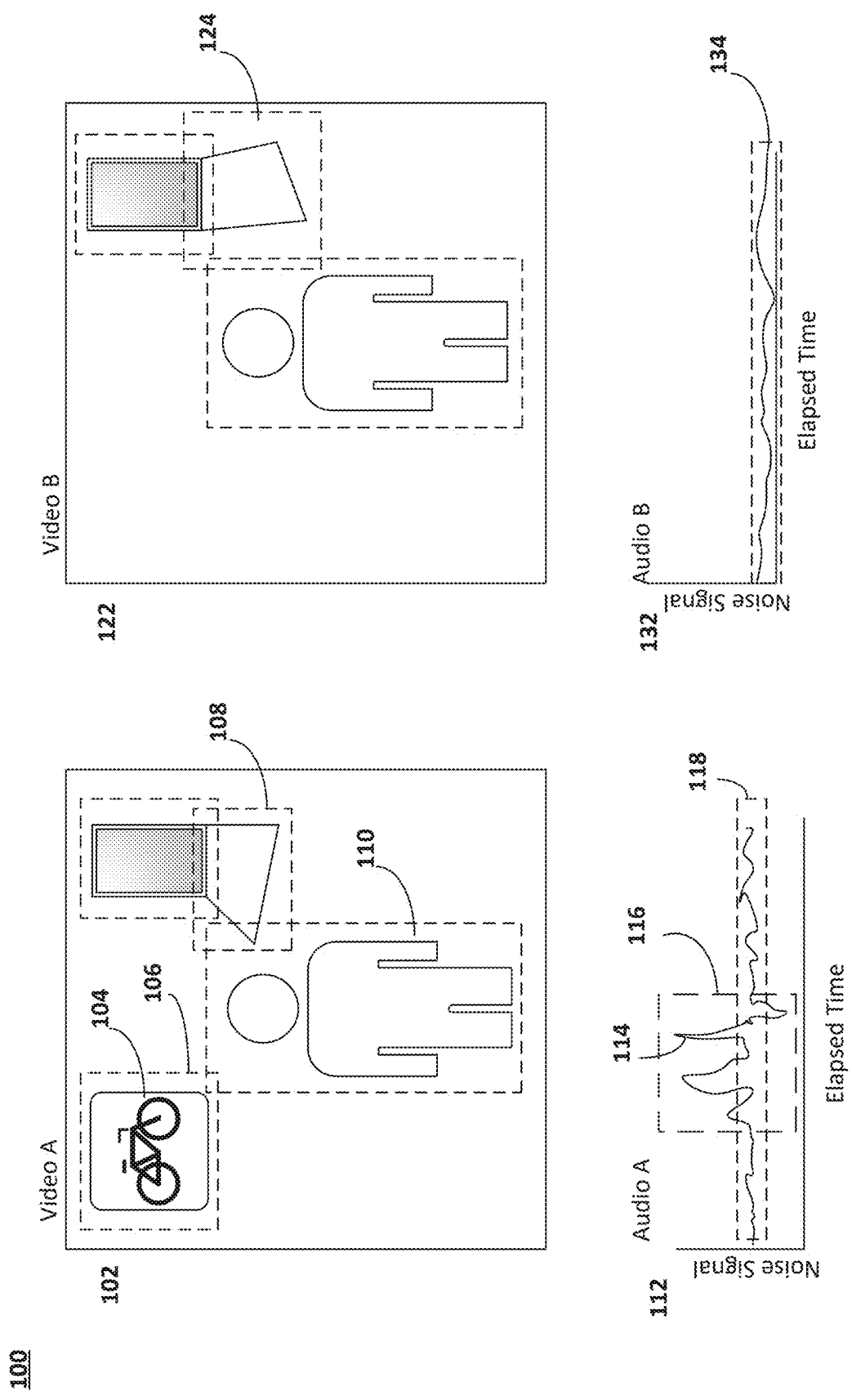
FIG. 1A and FIG. 1B illustrate video and audio recordings of a user at a first and second time, respectively, with detected features highlighted, in accordance with one or more embodiments.

FIG. 1A and FIG. 1B illustrate schematic 100 of video and audio recordings of a user for a first and second time, respectively, with detected features highlighted, in accordance with one or more embodiments. As an illustrative example, the system may receive a request from a user requesting authentication for a computing service, such as for a cloud server. In response, the system may request that the user record audio, video, or other data for verification of the user's identity. As an illustrative example, in response to the request, the user may transmit video, audio, or digital images to the system. The media received by the system may include voice samples or images of the user to aid authentication of the user's identity.

For example, schematic 100 depicts frame 102 from Video A at a first point in time, and frame 122 from Video B at a second point in time. Frames 102 or 122 may include region 110 depicting an image of the user's face or other physical features. Furthermore, Videos A and B may capture other features that do not directly correspond to the user, such as background object 104. Additionally or alternatively, the system can determine features within audio recordings. For example, the system may receive or generate audio data 112 from Audio A and can detect features, such as human voice feature 114, within the audio data. By detecting features within media recordings corresponding to a user, the system disclosed herein enables validation of a user's identity or genuineness based on both a depiction of the user itself (e.g., a voice or an image of the user's face), as well as the surroundings of the user (e.g., objects or features in the background), thereby improving the sensitivity of the system to identify security threats and false authentication attempts associated with accessing, for example, online cloud computing or bank accounts.

The system may receive an authentication request. In some embodiments, an authentication request may include a request from a user for authentication and subsequent access to a system or resource. For example, the authentication request may include a request to access a computing system, such as a cloud server or high-performance computing cluster. Additionally or alternatively, the authentication request may include a request to access an online account, such as a social media account or a bank account. In some embodiments, the authentication request may include a user accessing a mobile application or a website for subsequent access to a corresponding computing system. In response to the authentication request, the system may determine the authenticity of the user and provide access accordingly.

As an illustrative example, in response to the authentication request, the system may generate a user verification request and transmit this request to the user. For example, in some embodiments, the user verification request may include a request for credentials from the user. The user verification request may include a form generated for display on a user interface that requests user credentials, such as a username, a password, or a Completely Automated Public Turing test to tell Computers and Humans Apart (CAPTCHA). The system may include requests for other methods of authentication—for example, the system may include a request for media proving the user's presence at a corresponding user device. The request may include a description of the requested media, such as an indication that digital images and audio recordings are requested. In some embodiments, the system may transmit a request to the user through the corresponding user device for permission to have access to recording devices associated with the user device. For example, the system may request permission for accessing the microphone and/or camera associated with the user's device. By requesting such information from the user in response to the authentication request, the system enables the user to provide evidence regarding their presence and authenticity.

In some embodiments, the system may request that the user perform a physical pose (e.g., a pose request). For example, a pose request may include a request for a user to perform a pose, such as one or more gestures or movements, in front of a recording device such as a camera or a camcorder. Physical poses may include high fives or hand gestures (e.g., thumbs-ups). In some cases, the system may request that the user perform an act in real time, such as jumping jacks, a nod, or another non-static action. The system may generate prompts, visual guides, or other indications for display on the user device in order to provide instructions to the user. Additionally or alternatively, the system may modify the pose requested from a user based on authentication attempt, authentication time, or user identifier. For example, the system may generate the requested pose in a manner that is difficult to predict by external entities. The system may subsequently validate whether the user's measured pose approximates the requested physical pose, thereby enabling verification of the real-time presence of the user. Thus, the system may discourage malicious entities from utilizing previous recordings of the user for fraudulent access to the underlying system (e.g., access to online credit card accounts).

In some embodiments, the system may request media content from users. Media content may include information, data, or representations depicting sights, sounds, touch, or any other sense. For example, media content may include recordings (e.g., media recordings) of audio, video, images, or touch-related information (e.g., fingerprints) relating to a user. For example, a media recording may include media acquired with a device, such as a user device. A media recording may include a recording using a camera, camcorder, microphone, accelerometer, or another recording device. For example, a media recording may include photos, such as digital images (e.g., in portable network graphics (PNG), tag image file (TIFF), joint photographic experts group (JPEG), or bitmap (BMP) formats). By receiving images corresponding to users, the system may authenticate users based on images of the user and the surroundings. For example, the system may utilize facial recognition techniques to authenticate that an image of a user's face corresponds to an authorized user of the system. Furthermore, by analyzing images for other objects or entities within given digital images, the system may capture and analyze information that may be indicative of risk of fraud or malicious activity, such as objects or images that are not consistent with the user requesting authentication.

The system may detect features within media recordings. In some embodiments, a feature may include an indication, element, or object of interest within media. For example, a feature may include objects or visual elements within a digital image or a video, such as furniture or light in the background of an image. In some embodiments, a feature may include indications of noises, such as signals that represent background noises within an audio recording represented by amplitude and frequency data (e.g., a background feature within a spectrogram representing sound). For example, an indication of a feature may include information characterizing the feature, such as spectrogram data that represents the amplitude and frequency of a given background noise, a textual description of the feature, or a data representation of an image representing the feature. The system may categorize features into feature types (e.g., feature classifications), such as by identifying the nature of the feature. An example of a feature type may include an indication that a feature is a "background noise" as opposed to a "background object" or a "background light." In some embodiments, features may be identified with identifiers, such as an object being identified as a "bicycle" or a "window" using a corresponding text string or numerical identifier. Any features that the system detects within media recordings may be instrumental in determining a probability that a user is indeed the claimed, authorized user. For example, the system may determine whether objects, noises, light, or other features detected in media recordings provided by the user are indeed consistent with the user, or whether these features are indicative of potential security breaches or fraudulent activity.

In some embodiments, a media recording may include one or more images, such as frames within a video. For example, the system may receive a video recording that includes audio recordings and frames of images, in a video format such as MP4 or Audio Video Interleave (AVI) formats. For example, a frame of a video may include frames 102 or 122 as shown in FIG. 1A-B, such as a corresponding image of a moment in Video A or Video B respectively. By capturing video, the system may account for a user's movement. For example, the system may capture whether a user's movements in a video are natural or if they are likely indicative of computer-generated graphics. As such, by considering multiple frames of images, as in a video, the system may better determine an authentication status for the user.

As an illustrative example, the system may detect objects within image frames, such as background objects or users within frame 102. For example, the system may detect background object 104 in region 106 of frame 102, which may be determined to be a bicycle or another non-user object. Alternatively or additionally, the system may detect that a user is within region 110 of frame 122, and, in some cases, identify the user through facial recognition or other user recognition models. The system may detect objects such as windows in the background, which may be associated with light, as shown in region 108 of frame 102. By detecting objects in the background of images, or by detecting the user, the system may leverage the media received at the system in order to evaluate the likelihood that a user is as they claim to be. For example, the system may receive two videos or images, such as frames 102 and 122, and may determine that one or more objects are missing in one frame that was compared to another. For example, the system may determine that background object 104 in region 106 of frame 102 in Video A is missing from frame 122 of Video B. As such, the system may determine that there is a likelihood that one or more of the frames are forged or unauthentic and, therefore, that further authentication of the user may be necessary. Thus, by considering objects or other visual features in the background of images received at the system, the system may evaluate security risks with respect to user authentication (e.g., for mobile applications that enable access to user bank accounts) in a more sensitive manner.

In some embodiments, the system may detect light in the background of an image, video, or another recording. For example, the system may detect sunlight within regions 108 or 124 of the digital images, such as light coming from windows. An indication of light may, for example, include a portion of images that are brighter, a different color, or otherwise different from other portions of the image in a manner that suggests a light feature. Light may arise from varying sources, such as the sun, a lamp, or another light generator. An indication of light may include rays of light with a particular direction (e.g., as indicated by edges of shadows in the image). By detecting the direction of light within media recordings provided by users, the system may evaluate the authenticity of such media based on light-related factors. For example, in some embodiments, the system may determine an estimated direction of light associated with the indication of light detected in a frame of a video. The system may calculate an expected direction of light based on, for example, a timestamp, location, or device orientation determined for the media. By comparing the direction of light and the expected direction of light, the system may determine whether the media recording is consistent with the user at the claimed location and place, for example. Furthermore, in some embodiments, the system may detect changes in the direction of light and determine whether these are consistent. For example, the light in region 108 of frame 102 and region 124 of frame 122 differ, which may be indicative of fraudulent or inconsistent media recordings from the user if the time between the two frames is determined to be relatively short. As such, by considering light in the background of a media recording, the system may better evaluate a user's request for authentication and, as such, improve system security.

In some embodiments, the system may leverage accelerometer data. Accelerometer data may include data that provides force information, such as information relating to forces acting upon the user device associated with the user in question. For example, accelerometer data may include data from accelerometers that include indications of device orientation (e.g., through measurement of the force of gravity). By considering accelerometer data, the system may determine the orientation of a device on which media recordings are being generated, thereby providing contextual information relating to the expected or apparent position and orientation of objects within the media recording. For example, user device orientation information based on accelerometer data may be inconsistent with a perspective associated with a digital image. As an illustrative example, the system may detect when the system appears to be lying flat according to accelerometer data but being held vertically according to image or video data. In response, the system may detect inconsistencies in the recorded media and, therefore, determine a risk that the user may not be the claimed authorized user of a given user account of a credit card account.

In some embodiments, a media recording may include an audio recording, such as a recording of a user's speech. For example, an audio recording may include a recording of a user's voice (e.g., a voice recording) in an audio format such as Waveform Audio File (WAV), Free Lossless Audio Codec (FLAC), and Moving Picture Experts Group Layer-3 (MP3) formats. In some embodiments, the system may generate the user verification request to include a sentence, phrase, or sound for the user to generate and record within an audio recording. For example, audio data 112 corresponding to an audio recording (e.g., Audio A) may include speech or another feature, as indicated by human voice feature 114 in region 116 of the audio data. The system may utilize such audio recordings to determine the authenticity of a user, such as through voice recognition or speech recognition models. In some embodiments, the system may determine whether the audio recording includes the requested sentence, phrase, or sound in order to validate that users' voices are indeed in response to the user verification request. Additionally or alternatively, the system may identify other noises or sounds in audio recordings, such as traffic noises, construction noises, ventilation system sounds, or other background noises or sounds. By doing so, the system may identify elements within the audio recording that may be indicative of fraudulent behavior, such as falsified audio or video recordings, thereby improving the sensitivity of the authentication system.

In some embodiments, the system may detect background noise features within audio recording-related data. For example, the system may detect background noise 118, as shown in audio data 112 corresponding to an audio recording (e.g., Audio A). In some embodiments, the system may analyze, evaluate, or characterize background noise 118, such as by calculating an average pitch/frequency or amplitude of the background noise, or by identifying the source of a background noise. As an illustrative example, the system may determine that background noise corresponds to traffic noise from outside of the room. In some embodiments, the system may correlate background noise (or any other sounds) within an audio recording with objects or phenomena detected within videos, images, or other media. Background noise may provide contextual information that aids in determining the authenticity of a user corresponding to the given media recordings. For example, the system may determine that audio data 112 from one recording (e.g., Audio A) at one time includes background noise 118, while the nature of the background noise has changed in other audio data 132 (e.g., as compared with background noise 134) from another recording (e.g., Audio B), even if the time interval between the two recordings is short, or if the location indicated by the device or other media recordings is unchanged. As such, the nature of the background noise detected by the system may indicate a likelihood that a given user authentication task is risky or indicative of fraudulent activity.

FIG. 1C depicts data structure 140 describing detected features within video and audio recordings of a user, in accordance with one or more embodiments. For example, data structure 140 records features detected in media recordings received from a user (e.g., detected features 144), as well as an indication of the media recording in which the given feature was detected (e.g., recordings 142). In some embodiments, data structure 140 includes timestamps 146 corresponding to the detection of the given features. Furthermore, the system may determine feature classifications 148 classifying each feature. As such, data structure 140 provides information that may be useful in evaluating the nature of a user's media recordings and whether they may accurately depict the claimed user.

As an illustrative example, the system may determine a degree of consistency between features recorded within media recordings or portions of media recordings corresponding to the user. For example, the system may determine whether two detected objects are likely associated with a common object. As an illustrative example, the system may determine that Video A (e.g., as represented by frame 102 in FIG. 1A) includes an indication of a bicycle, while Video B (e.g., as represented by frame 122 in FIG. 1B) may not include a bicycle. The system may quantify a degree to which the media recordings are consistent with each other, including a likelihood or a probability that a common object is included in more than one media recording associated with a given user. Alternatively or additionally, the system may determine whether a characterization of a detected feature is consistent across media recordings (e.g., whether media recordings are associated with similar audio environments or physical environments). For example, Audio A (e.g., represented by audio data 112) may include background noises that are associated with or predicted to be traffic sounds, while Audio B (e.g., represented by audio data 132) may include background noises that do not reflect traffic sounds, but rather are associated with white noise (e.g., from a fan, or from sensor related noise). As such, the system may generate a degree of consistency between Audio A and Audio B based on the differences in detected features 144 (e.g., a percentage of features that are missing across different times or recordings). Alternatively or additionally, the system may determine a set of visual differences, such as differences between features detected in Video A or frame 102 in relation to Video B or frame 122. By doing so, the system may further evaluate the likelihood that a user of a user device is indeed an authorized user (e.g., of a credit card account), or whether there may be fraudulent or malicious entities associated with the recordings.

In some embodiments, the system may generate one or more metadata requests that request further information relating to one or more media recordings received by the system. As an illustrative example, a metadata request may include a request from the system to a user device for information relating to the location, time, or orientation of the user device. For example, a metadata request may include a request for global positioning system (GPS) data, accelerometer data, or system clock data. In response to the metadata request (or, in some embodiments, without the metadata request), the system may receive location, time, or accelerometer information relating to media recordings. For example, the system may receive an indication of timestamps associated with recordings. The system may determine timestamps 146 indicating times at which corresponding features are detected. By determining such information, the system may determine whether such metadata information is consistent with the media recordings themselves—for example, the system may determine that, while a timestamp indicates that it is night outside, a received video recording indicates that the time corresponding to the video is daytime (e.g., based on an indication of sunlight), thereby presenting as a risk factor for authenticating the given user.

FIG. 2A illustrates risk determination models capable of evaluating the risk associated with authenticating a user based on features detected within media recordings of the user, in accordance with one or more embodiments. For example, FIG. 2A includes data structure 200, which indicates models that are available for evaluation of the risk associated with authenticating a given user. For example, data structure 200 may represent a model database, which includes information and/or metadata associated with risk determination models. For example, the model database may include model identifiers 202 that identify particular risk determination models, where each model is associated with model classifications 204. In some embodiments, the model database represented by data structure 200 may include information relating to the inputs, outputs, or use of the corresponding risk determination models.

The system may determine risk factors associated with user authentication using risk determination models. In some embodiments, risk factors associated with user authentication may include indications of feature types or particular features that are associated with fraudulent or malicious authentication attempts. For example, a risk factor may include background light detected in one or more media recordings that are not consistent with a corresponding timestamp or expected light direction. As such, by identifying models that enable evaluation of risk factors for user authentication, the system may better evaluate and mitigate security risks associated with authenticating users with a given authentication attempt (e.g., with given media recordings associated with the user).

The system may utilize risk determination models associated with evaluation of risk factors. For example, a risk determination model may include a machine learning model, algorithm, or manner of determining a risk of authenticating a user given associated media recordings received from the associated user device. For example, a risk determination model may include an artificial neural network that accepts media recordings, portions of media recordings, or indications of detected features as inputs, and may output risk metrics as outputs (as discussed further in relation to FIG. 2B). As an illustrative example, a risk determination model may include a model that accepts an indication of natural light through a window (or a corresponding direction) as determined in the frame of a received video recording, as well as a device orientation, location, and timestamp. In response, the corresponding risk determination model may output a probability that the indication of natural light is consistent with the given orientation, location, and timestamp of the user device at the time of recording, thereby generating a risk metric associated with the background light within the media recordings. In some embodiments, the risk determination models may generate other risk metrics as outputs, including quantitative or qualitative assessments of risks associated with authenticating a given user. The system may identify risk determination models based on model identifiers 202. For example, model identifiers may include alphanumeric indicators that identify risk determination models uniquely (e.g., model identifiers "A" or "2B"), where the model identifiers may indicate a type of input or media recording associated with the model. Alternatively or additionally, risk determination models may be associated with one or more features or risk factors and classified as such (e.g., using model classifications, as discussed below). As such, risk determination models may be capable of detecting risks associated with authenticating users with respect to a variety of factors, features, or media recordings associated with the user.

Risk determination models may accept or be trained with training data. As an illustrative example, training data may include indications of features, media recordings, or other information corresponding to users. Training data may be labeled with corresponding authentication statuses associated with the given inputs—for example, a risk determination model may be trained using a plurality of media recordings associated with multiple users, where each media recording includes an indication of the corresponding user's determined authentication status during transmission of the media recording. As such, the system may train risk determination models to determine a risk or probability that a given detected feature or media recording is associated with fraud or malicious behavior.

Risk determination models may be associated with corresponding model classifications. A model classification may include a classification of a model based on features and/or risk factors analyzed by the model. For example, model classifications 204 may indicate whether a corresponding risk determination model is associated with evaluating risk due to background noises, human speech, background objects, images of humans, background light, or sentiment analysis (e.g., of instant messages sent by the user). For example, a model classification may include a feature type that the corresponding risk determination may accept as input. Such indications of model classifications may include textual identifiers (e.g., a label such as "background noise" associated with a given model identifier). Alternatively or additionally, model classifications may include alphanumeric identifiers corresponding to the risk determination model's accepted inputs or other characteristics. By classifying models, the system may determine how to evaluate the risk of authenticating a given user based on the detected features in corresponding media recordings. For example, authenticating a user based on various detected features may benefit from differing methods of evaluation and, therefore, different risk determination models. For example, the system may determine that a given detected feature (with a corresponding feature type) matches a corresponding model classification and select the corresponding risk determination model for further evaluation of risk.

FIG. 2B illustrates risk metrics generated by risk determination models based on features detected within media recordings, as well as a corresponding authentication probability, in accordance with one or more embodiments. For example, FIG. 2B depicts data structure 210, which includes risk metrics 214 generated by risk determination models identified by model identifiers 212, as well as authentication probability 220. As an illustrative example, the system may input indications of features detected within media recordings received from a user device (e.g., illustrated by data structure 140) into corresponding risk determination models and generate, as output, corresponding risk metrics 214.

For example, a risk metric may include a quantitative representation of a risk of authenticating a user. A risk metric may represent a likelihood, probability, or measure of whether a user transmitting an authentication request is indeed an authorized user of the given account or system based on a particular feature, factor, or recording transmitted to the system. For example, a risk determination model considering one or more features within submitted media recordings may output corresponding probabilities that the given features are associated with fraudulent or malicious authentication attempts. As an illustrative example, Model 1A (corresponding to background noise) may determine, due to a change in the nature of background noise between Audio A and Audio B, that the background noise is not consistent across the audio recordings. Thus, the system may determine that it is likely that there is a high risk associated with authenticating the user (e.g., that one of the audio recordings is artificially generated or does not correspond to the same audio environment as the other audio recordings). As such, the risk determination model corresponding to background noise may output a relatively large risk metric. In contrast, risk determination models corresponding to human speech or human images may indicate that the user sounds like and appears like the claimed authorized user of the system and, thus, that these features detected in the media recordings are not, in their own rights, indicative of fraud.

The system may determine an authentication probability based on these evaluated risk metrics. For example, the system may combine or analyze risk metrics output by more than one risk determination model in order to determine the authentication probability, where the authentication probability indicates an overall likelihood that the media recordings received by the system correspond to the claimed or previously authorized user of the system. In some embodiments, the authentication probability may be calculated using an authentication probability model, which may include algorithms, machine learning models, or other methods for computing authentication probabilities based on risk metrics. For example, the system may compute an average of the generated risk metrics. In some embodiments, the system may weigh different risk metrics with different weighing factors, depending on a significance of a given risk factor, feature, or risk determination model to evaluation of security risks for the system. As an illustrative example, detection of background objects may be given less weight than detection of background light, as background objects may be moved or image perspective may be changed between media recordings without necessarily indicating fraudulent behavior. The authentication probability may be compared with a threshold probability (e.g., pre-determined or determined based on information relating to the user). If the authentication probability is greater than the threshold probability, the system may determine that the user likely corresponds to the claimed authorized user of the system and, therefore, may not take further action. Alternatively or additionally, if the system determines that the authentication probability is less than the threshold probability, the system may request further credentials or authentication from the user, in order to improve confidence that the user is indeed the claimed authorized user of the given system or user account (e.g., bank account).

For example, based on comparing the authentication probability with the threshold probability, the system may generate an authentication message for display on the user device (or through another user interface other than a display, for example). The authentication message may indicate an authentication status, such as an indication of whether the user is authenticated, or whether further authentication steps may be necessary. For example, the authentication message may include an indication that the user of the user device is not yet authenticated due to risk factors identified through the risk determination models and, as such, that the user may submit further credential information or evidence of their presence in order to access a corresponding bank account. By doing so, the system ensures that malicious or fraudulent entities may not access a given system in situations where submitted media recordings introduce doubt as to whether the user requesting access to the bank account indeed is as they claim.

Figure 3:
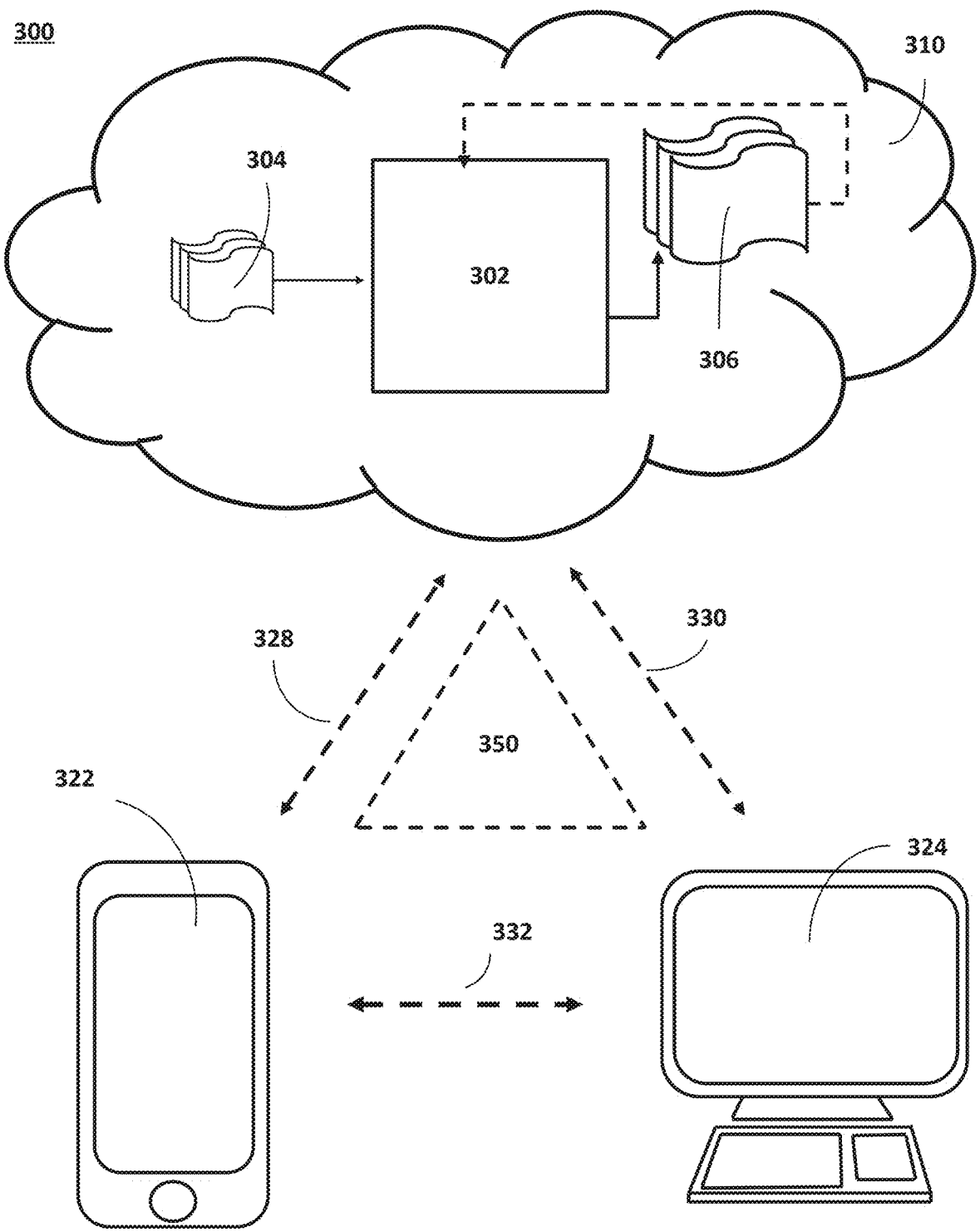
FIG. 3 shows illustrative components for a system used to evaluate media recordings for user authentication, in accordance with one or more embodiments.

FIG. 3 shows illustrative components for a system used to authenticate users of bank accounts based on media recordings submitted by the user, in accordance with one or more embodiments. For example, FIG. 3 may show illustrative components for determining whether a user of a mobile device may access a bank account based on digital videos and audio recordings of themselves, and whether background information concerning their surroundings is consistent with their claimed location or recording time. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, \ while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include data structures that represent model databases, model identifiers, model classifications, risk metrics, authentication probabilities and corresponding training data. For example, cloud components 310 may access user databases, such as servers or computer systems storing user credential information. In some embodiments, cloud components 310 may access image recognition, voice recognition, or facial recognition models and related model weights, training data, or other information.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a probability of whether a user likely corresponds to the claimed authorized user of a bank account).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an indication of a probability of whether a user likely corresponds to the claimed authorized user of a bank account).

In some embodiments, the model (e.g., model 302) may automatically perform actions based on outputs 306. In some embodiments, the model (e.g., model 302) may not perform any actions. The output of the model (e.g., model 302) may be used to deny user access to a bank account based on a determination of risk factors associated with authenticating the user based on submitted media recordings.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
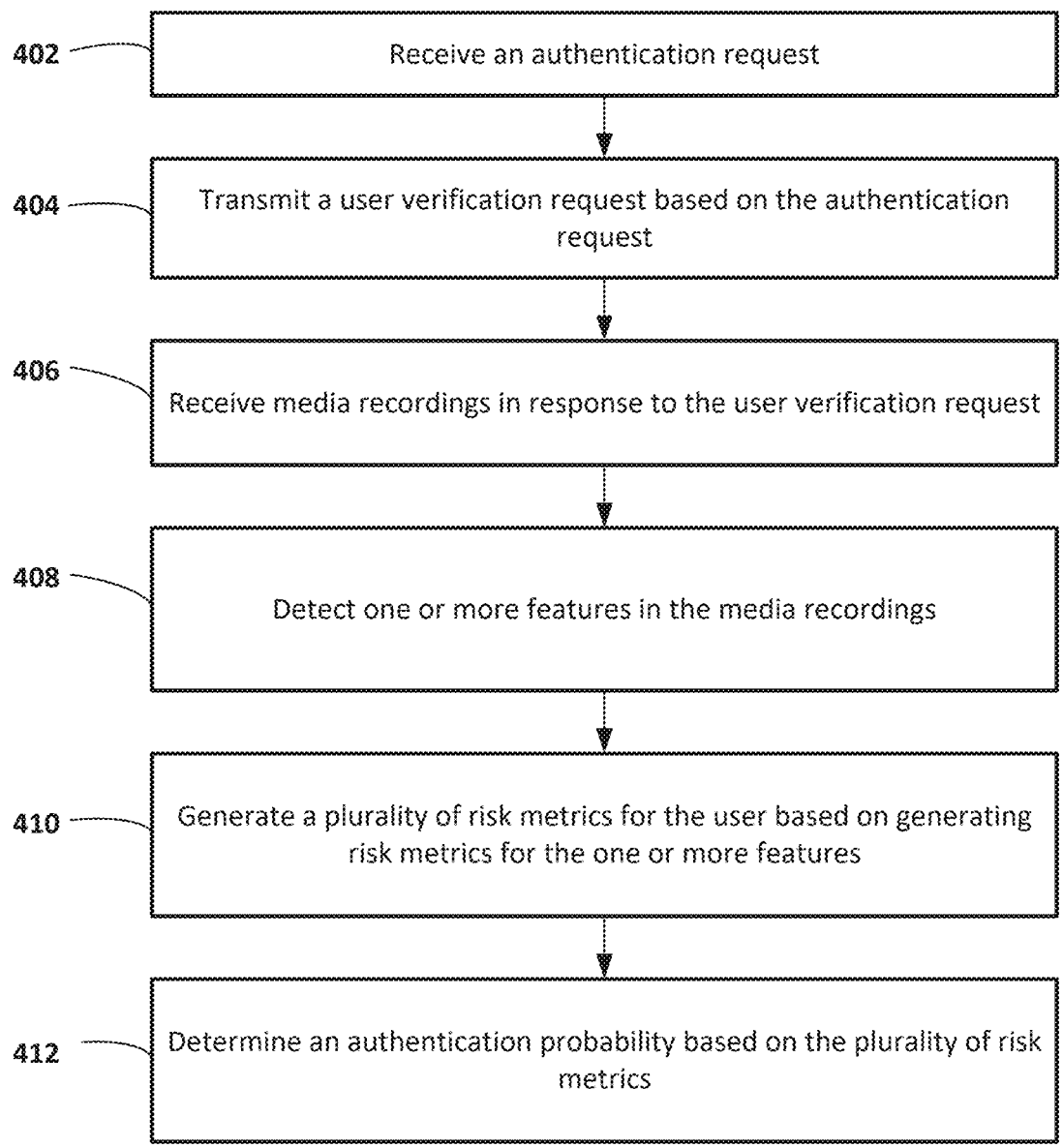
FIG. 4 shows a flowchart of the steps involved in authenticating a user based on features detected within received digital media recordings of the user, in accordance with one or more embodiments.

FIG. 4 shows a flowchart of the steps involved in authenticating a user based on features detected within received digital media recordings of the user, in accordance with one or more embodiments. For example, the system may use process 400 (e.g., as implemented on one or more system components described above) in order to determine whether a user requesting access to a banking system is associated with an authorized user of the system.

At 402, process 400 (e.g., using one or more components described above) enables the system to receive an authentication request. For example, the system may receive, from a user device associated with a user, an authentication request, wherein the user device is configured to record media content associated with the user. As an illustrative example, the system may receive an indication that a user would like to log into a user account associated with a bank account, such as through accessing a corresponding mobile application. In some embodiments, the user may submit, along with the authentication request, an indication of user credentials (e.g., a bank account number, username, or password). The user device may be capable of recording images, audio, or video (e.g., as in a smartphone, tablet, or laptop). By receiving such a request, the system may evaluate the degree of authentication that may be required from the user prior to providing access to the system, thereby enabling control of security and access to the requested account.

At 404, process 400 (e.g., using one or more components described above) enables the system to transmit a user verification request based on the authentication request. For example, based on the authentication request, the system may transmit a user verification request to the user device, wherein the user verification request indicates a request for media recordings of the user. As an illustrative example, in response to receiving a user's request to access a corresponding online bank account, the system may determine to request further media that authenticates the user's presence at the location of the user device. For example, the system may request that the user submit photo, video, or audio evidence of their presence, such as through the user device's cameras or microphones. The system may require that the user submit multiple recordings of varying data formats (e.g., audio, video, or images) over time. By doing so, the system may ensure that the user requesting access to the corresponding bank account is indeed the authorized user of the corresponding user account.

At 406, process 400 (e.g., using one or more components described above) enables the system to receive media recordings in response to the user verification request. For example, the system may receive one or more media recordings from the user device in response to the user verification request. As an illustrative example, the user may record a video of themselves, including digital images of themselves (e.g., faces) along with speech (e.g., recordings of their voice), in response to the request for further verification. The user may transmit this back to the system in order to verify their identity and, therefore, request access to an associated online bank account or secure resource. By doing so, the system may receive information that aids in validating the presence of the user requesting access to sensitive or secure systems.

At 408, process 400 (e.g., using one or more components described above) enables the system to detect one or more features in the media recordings. For example, the system may detect one or more features in the one or more media recordings, wherein each feature of the one or more features is associated with a corresponding risk factor for user authentication. As an illustrative example, the system may receive multiple media recordings corresponding to audio, video, or images. The system may detect features within the media recordings, such as faces or objects (e.g., as in images or video), and background noises or speech (as in audio recordings or video). By doing so, the system may identify features that may be material to determining an authentication status for the user based on the surroundings and circumstances associated with the media recordings, thereby improving the sensitivity of the system to detection of suspicious or malicious entities (e.g., fraudulent entities attempting to access authorized users' bank accounts).

At 410, process 400 (e.g., using one or more components described above) enables the system to generate a plurality of risk metrics for the user based on generating risk metrics for the one or more features. For example, the system may determine a corresponding risk determination model for a corresponding feature of the one or more features. The system may generate a corresponding risk metric for the user based on providing the one or more media recordings to the corresponding risk determination model for the corresponding feature. As an illustrative example, the system may input each detected feature (e.g., each object or sound detected in media recordings from the user device) into risk determination models that handle that corresponding feature type. By doing so, the system may output risk metrics corresponding to a presence, absence, or change in the detected features. To illustrate, the system may provide detected background noises as input into a first risk determination model associated with evaluation of background noises and detected background objects as input into a second risk determination model associated with evaluation of background objects. Based on outputs from each risk determination model, the system may determine corresponding risk metrics. By doing so, the system may evaluate various factors associated with recordings provided by the user for risk of impersonation or fraud.

In some embodiments, the system may determine the risk determination model to utilize based on generating feature classifications for detected features. For example, the system may generate a corresponding feature classification, wherein the corresponding feature classification indicates a corresponding type of the corresponding feature. The system may retrieve a plurality of model identifiers from a model database, wherein each model identifier of the plurality of model identifiers identifies an associated risk determination model and an associated model classification, and wherein the associated model classification indicates an associated input feature type for the associated risk determination model. The system may identify a match between the corresponding feature classification for the corresponding feature and a model classification associated with the plurality of model identifiers. Based on identifying the match, the system may determine the corresponding risk determination model based on a first model identifier associated with the model classification. As an illustrative example, the system may detect features that may be classified as background noises or background objects and select risk determination models based on these classifications. By doing so, the system ensures that models that are specialized to handle particular risk factors are selected, thereby improving the accuracy of risk evaluation and subsequent authentication of the user.

In some embodiments, the system may evaluate the risk associated with authenticating the user based on the direction of light detected in one or more media recordings received from the user. For example, the system may determine that a first feature of the one or more features includes an indication of a light in the one or more media recordings. Based on the indication of the light, the system may determine an estimated light direction, wherein the estimated light direction indicates a direction of a source of the light in relation to the user device. The system may transmit a metadata request to the user device, wherein the metadata request requests location information and time information for the user device. In response to the metadata request, the system may receive a user location and a timestamp from the user device. The system may generate an expected light direction based on the user location and the timestamp. The system may determine a first risk metric of the plurality of risk metrics corresponding to the first feature based on the expected light direction and the estimated light direction. For example, the system may determine that an image received from the user device includes rays of light from a window, which are incident on a wall in a particular direction. The system may determine the direction of these rays of light. Based on metadata relating to the user device's location and time at this location, the system may generate a likelihood or metric that the image depicting the light is consistent with this metadata or if it is inconsistent and, therefore, indicative of potential fraud or impersonation.

For example, the system may input the indication of light (e.g., an indication of the direction of light) into a risk determination model in order to generate a quantitative likelihood of fraud or risk associated with authenticating the user. For example, the system may determine a first risk determination model, wherein the first risk determination model is associated with light directions in photos or videos. The system may generate the first risk metric of the plurality of risk metrics corresponding to the first feature based on providing the estimated light direction, the user location, and the timestamp to the first risk determination model. As an illustrative example, a machine learning model (e.g., the first risk determination model) may be trained to evaluate the consistency of directions of light in images with respect to the image's location, orientation, and time. As such, by providing the machine learning model the corresponding input, the system may evaluate the probability that the image is accurate with respect to the claimed surroundings or circumstances of the user device, thereby improving the sensitivity of the system to fraud detection.

In some embodiments, the system may evaluate the presence of background objects and whether they are consistent with a user's location or time of recording. For example, the system may determine that a first feature of the one or more features includes a background object, wherein the background object is a non-user object in a photo or video of the one or more media recordings. The system may transmit a metadata request to the user device, wherein the metadata request requests location information and time information for the user device. In response to the metadata request, the system may receive a user location and a timestamp from the user device. The system may determine a first risk determination model, wherein the first risk determination model is associated with background objects in photos or videos. The system may generate a first risk metric of the plurality of risk metrics corresponding to the first feature based on providing the user location, the timestamp, and an indication of the background object into the first risk determination model. For example, the system may determine objects in the background, such as vehicles, trees, or furniture. By considering contextual information, such as the indicated location and time of the recordings (e.g., of the user device making the recording), the system may evaluate whether these objects are consistent with this information. For example, if a tree is detected in a digital image provided by the user that only grows in a particular region of North America, the system may, using a risk determination model, determine the extent to which a user's location may be consistent with the native habitat of the detected tree, thereby improving the sensitivity of the system to attacks by malicious actors that may be in a different location to the claimed, authorized user's physical location.

In some embodiments, the system may generate risk metrics based on consistency between multiple background objects detected in different images or frames of videos. For example, the system may determine that a first feature of the one or more features includes a first image of a first background object in a first media recording of the one or more media recordings. The system may determine that a second feature of the one or more features includes a second image of a second background object in a second media recording of the one or more media recordings. The system may determine a degree of consistency between the first image and the second image, wherein the degree of consistency indicates a likelihood that the first background object and the second background object are associated with a common object. The system may generate a first risk metric of the plurality of risk metrics based on the degree of consistency. For example, the system may determine whether the same object is found in multiple videos or images corresponding to the same user, or a degree to which the objects are likely to be the same object. Based on this degree of consistency, the system may determine the risk (e.g., likelihood) that, for example, the various videos or images were taken fraudulently at different times, indicating that the recordings were potentially stolen or hacked from the user previously. By doing so, the system improves detection of malicious attempts to access, for example, a user's bank account or credit card account.

In some embodiments, the system may generate risk metrics based on consistency between multiple background noises detected in different audio recordings or video recordings. For example, the system may determine that a first feature of the one or more features includes a first background noise in a first audio recording of the one or more media recordings. The system may determine that a second feature of the one or more features includes a second background noise in a second audio recording of the one or more media recordings. The system may determine a degree of consistency between the first background noise and the second background noise, wherein the degree of consistency indicates a likelihood that the user device is in a similar audio environment during the first audio recording and the second audio recording. The system may generate a first risk metric of the plurality of risk metrics based on the degree of consistency. For example, the system may determine whether a similar background noise (e.g., traffic sounds) is consistent across multiple audio recordings taken by the user device, or a degree to which the background noises may be consistent with each other. Based on this generated degree of consistency, the system may determine a risk that the audio recordings were taken at different moments or in different locations, indicating that the audio may have been maliciously acquired at different times. By doing so, the system enables more accurate detection of fraudulent or malicious entities attempting to access, for example, a user's bank account based on audio data stolen from the user non-contemporaneously.

In some embodiments, the system may evaluate the user's authentication request by detecting background noise features over multiple time periods (e.g., when capturing both voice recordings and digital photos). For example, the system may transmit the user verification request to the user device to include a request for at least one voice recording of the user and for at least one digital photo of the user, wherein the user verification request includes a request for permission to record audio from the user device for a first period of time comprising a second period of time and a third period of time. The system may determine that the one or more media recordings include a voice recording and a digital photo, wherein the voice recording includes first audio content from the second period of time, wherein the digital photo is associated with second audio content of the voice recording, and wherein the digital photo and the second audio content were captured by the user device during the third period of time. The system may detect at least one background noise feature in the first audio content or the second audio content, wherein the at least one background noise feature is associated with a risk factor for user authentication. As an illustrative example, the system may request a voice recording of the user and a digital photo but enable the user device to continue to record audio during the capture of the digital photo (through requesting permission). The system may then analyze whether there has been a change in background noise throughout the media recording by the user by detecting whether there have been changes or differences between background features in the two recordings. By doing so, the system may evaluate whether one or more recordings were captured at a different time or under different circumstances, thereby improving detection of impersonation or other fraudulent attempts to access the system.

In some embodiments, the system may determine risk metrics based on both these detected background noises, as well as the digital photo itself, and determine an authentication probability based on one or more features from one or more media recordings using an authentication determination model. For example, the system may generate a first risk metric for the user based on providing the voice recording to a first risk determination model, wherein the first risk determination model is associated with background noises in audio recordings. The system may generate a second risk metric for the user based on providing the digital photo to a second risk determination model, wherein the second risk determination model is associated with background objects. The system may determine the authentication probability based on inputting the first risk metric and the second risk metric into an authentication determination model. As an illustrative example, the system may combine multiple risk metrics corresponding to multiple media types in order to determine an authentication probability, thereby improving the sensitivity of the system to a variety of risk factors.

In some embodiments, the system may determine whether a detected object is consistently included within a video recording (e.g., across multiple frames of a video recording). For example, the system may extract a plurality of frames from a digital video of the one or more media recordings. The system may determine a plurality of indications of background objects within the plurality of frames. The system may determine that a subset of the plurality of indications of background objects is included in more than one frame of the plurality of frames. Based on determining that the subset is included in the more than one frame of the plurality of frames, the system may generate a first risk metric of the plurality of risk metrics. For example, the system may determine whether a video has been artificially generated using non-contiguous frames by ensuring that objects are consistently included within the multiple frames of the video, thereby enabling the system to determine a corresponding risk metric. By doing so, the system may evaluate the likelihood that a submitted video corresponding to a user is not artificially generated and, therefore, evaluate the user attempting to access a secure system accordingly.

In some embodiments, the system may evaluate whether the measured user device orientation is consistent with the received media recordings. For example, the system may determine that the one or more media recordings include accelerometer data for the user device. The system may determine a first user device orientation based on the accelerometer data. The system may determine a first risk determination model, wherein the first risk determination model is associated with device orientations. Based on providing the first user device orientation into the first risk determination model, the system may generate a first risk metric of the plurality of risk metrics. As an illustrative example, while media recordings (e.g., images or videos) submitted by the user may indicate that the user device is vertical (e.g., parallel to a wall seen in the background of the video), accelerometer data associated with the user device may indicate that the device is flat or in another orientation; thus, by considering whether such device orientation information is consistent with the media recordings, the system may improve the sensitivity with which fraudulent or malicious entities attempting to access user bank accounts may be identified.

For example, in some embodiments, the system may determine the user device orientation based on an image of the user and the perspective of the camera in relation to the user. For example, the system may determine that the one or more media recordings include a digital image of the user. The system may determine a second user device orientation based on a perspective associated with the digital image. The system may generate a second risk metric of the plurality of risk metrics based on comparing the first user device orientation and the second user device orientation. For example, the system may determine that, based on the perspective of the digital camera used to capture a digital image, the device's actual orientation (as measured by an accelerometer) is not consistent with the media recordings at the same time. As such, the system may determine a risk factor accordingly, thereby improving the accuracy of fraud detection (e.g., detection of artificially generated media).

In some embodiments, the system may evaluate visual differences between multiple media recordings corresponding to the user. For example, the system may determine that the one or more media recordings include one or more digital images of the user. The system may determine a set of visual differences between a first digital image and a second digital image, wherein the one or more digital images comprise the first digital image and the second digital image. Based on providing the set of visual differences between the first digital image and the second digital image to a first risk determination model, the system may generate a first risk metric of the plurality of risk metrics. As an illustrative example, the system may determine that the lighting, color, contrast, or picture quality between two images is different, even if the user claims to have taken both with the same camera. By detecting such visual differences, the system may detect situations in which images from different sources are being presented as coming from the same source, thereby improving the ability of the system to capture fraudulent attempts to access user information, such as online bank accounts or credit card accounts.

In some embodiments, the system may request that the user perform a physical pose and evaluate whether the user is actually performing this pose in the received media recordings. For example, the system may generate the user verification request to include a pose request, wherein the pose request indicates a physical pose to be performed by the user. The system may determine that the one or more media recordings include a digital photo or a digital video including the user performing an approximation of the physical pose. Based on providing the pose request and the digital photo or the digital video to a first risk determination model corresponding to user poses, the system may generate a first risk metric of the plurality of risk metrics. As an illustrative example, the system may ask that the user demonstrate a thumbs up pose on a video recording; in response to receiving a video recording from the user, the system may determine whether the user is completing the pose request as requested. In some embodiments, the system may alter the pose requested of the user. As such, the system may ensure that any media recordings transmitted to the system are in response to the verification request and, as such, prevent malicious entities from reusing previous user data for falsifying an authentication request.

At 412, process 400 (e.g., using one or more components described above) enables the system to determine an authentication probability based on the plurality of risk metrics. For example, the system may determine an authentication probability based on the plurality of risk metrics, the authentication probability indicating a likelihood that the one or more media recordings correspond to the user. As an illustrative example, the system may compile the risk metrics corresponding to different risk determination models (e.g., corresponding to different features or feature types) and determine an authentication probability considering all such risk metrics. The authentication probability may indicate a likelihood that the user is indeed the claimed, authorized user of the corresponding bank account, for example, or whether the user may be impersonating the authorized user. As such, the system enables evaluation of attempts to access secure or sensitive systems, such as online bank accounts or credit card accounts, and subsequent mitigation of security threats or fraudulent activity associated with access to these accounts.

In some embodiments, the system may determine authentication probabilities based on considering both risk metrics and the corresponding model classifications for the models that generated the corresponding risk metrics. For example, the system may determine a plurality of model classifications corresponding to the plurality of risk metrics, wherein each model classification of the plurality of model classifications is associated with the corresponding risk determination model for the corresponding risk metric. Based on providing the plurality of model classifications and the plurality of risk metrics to an authentication determination model, the system may generate the authentication probability. As an illustrative example, the system may consider or weigh the types of models or types of features associated with each risk metric, thereby improving the flexibility and sensitivity of the system with respect to varying risk factors or detected features. As such, the system may more accurately determine an authentication status for the user.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a user device associated with a user, an authentication request, wherein the user device is configured to record photo, video and audio content associated with the user; transmitting a user verification request to the user device based on the authentication request, wherein the user verification request indicates a request for at least one voice recording of the user and for at least one digital photo of the user; receiving, from the user device, a voice recording and a digital photo, wherein the voice recording includes first audio content from a first period of time, wherein the digital photo is associated with second audio content, and wherein the digital photo and the second audio content were captured during a second period of time; detecting at least one background noise feature in the first audio content or the second audio content, wherein the at least one background noise feature is associated with a risk factor for user authentication; determining a first risk determination model from a plurality of risk determination models, wherein the first risk determination model is configured to evaluate authentication risk factors based on background noise features; generating a first risk metric for the user in response to providing the first audio content and the second audio content to the first risk determination model; determining an authentication probability based on the first risk metric, the authentication probability indicating a likelihood that the voice recording and the digital photo correspond to the user; determining whether the authentication probability is greater than a threshold probability; and generating, for display on the user device, an authentication message indicating a user authentication status based on determining that the authentication probability is greater than the threshold probability.

2. A method comprising: receiving, from a user device associated with a user, an authentication request, wherein the user device is configured to record media content associated with the user; based on the authentication request, transmitting a user verification request to the user device, wherein the user verification request indicates a request for media recordings of the user; receiving one or more media recordings from the user device in response to the user verification request; detecting one or more features in the one or more media recordings, wherein each feature of the one or more features is associated with a corresponding risk factor for user authentication; generating a plurality of risk metrics for the user, wherein generating each risk metric of the plurality of risk metrics comprises: determining a corresponding risk determination model for a corresponding feature of the one or more features, and generating a corresponding risk metric for the user based on providing the one or more media recordings to the corresponding risk determination model for the corresponding feature; and determining an authentication probability based on the plurality of risk metrics, the authentication probability indicating a likelihood that the one or more media recordings correspond to the user.

3. A method comprising: receiving, from a user device associated with a user, an authentication request, wherein the user device is configured to record media content associated with the user; based on the authentication request, transmitting a user verification request to the user device, wherein the user verification request indicates a request for media recordings of the user; receiving one or more media recordings from the user device in response to the user verification request; detecting one or more features in the one or more media recordings, wherein each feature of the one or more features is associated with a corresponding risk factor for user authentication; generating a plurality of risk metrics for the user, wherein generating each risk metric of the plurality of risk metrics comprises:

determining a corresponding risk determination model for a corresponding feature of the one or more features, and generating a corresponding risk metric for the user based on providing the one or more media recordings to the corresponding risk determination model for the corresponding feature; and generating an authentication probability based on providing the plurality of risk metrics to an authentication determination model, the authentication probability indicating a likelihood that the one or more media recordings correspond to the user.

4. The method of any one of the preceding embodiments, wherein determining the corresponding risk determination model for the corresponding feature of the one or more features comprises: generating a corresponding feature classification, wherein the corresponding feature classification indicates a corresponding type of the corresponding feature; retrieving a plurality of model identifiers from a model database, wherein each model identifier of the plurality of model identifiers identifies an associated risk determination model and an associated model classification, and wherein the associated model classification indicates an associated input feature type for the associated risk determination model; identifying a match between the corresponding feature classification for the corresponding feature and a model classification associated with the plurality of model identifiers; and based on identifying the match, determining the corresponding risk determination model based on a first model identifier associated with the model classification.

5. The method of any one of the preceding embodiments, wherein determining the authentication probability based on the plurality of risk metrics comprises: determining a plurality of model classifications corresponding to the plurality of risk metrics, wherein each model classification of the plurality of model classifications is associated with the corresponding risk determination model for the corresponding risk metric; and based on providing the plurality of model classifications and the plurality of risk metrics to an authentication determination model, generating the authentication probability.

6. The method of any one of the preceding embodiments, wherein generating the plurality of risk metrics further comprises: determining that a first feature of the one or more features includes an indication of a light in the one or more media recordings; based on the indication of the light, determining an estimated light direction, wherein the estimated light direction indicates a direction of a source of the light in relation to the user device; transmitting a metadata request to the user device, wherein the metadata request requests location information and time information for the user device; in response to the metadata request, receiving a user location and a timestamp from the user device; generating an expected light direction based on the user location and the timestamp; and determining a first risk metric of the plurality of risk metrics corresponding to the first feature based on the expected light direction and the estimated light direction.

7. The method of any one of the preceding embodiments, further comprising: determining a first risk determination model, wherein the first risk determination model is associated with light directions in photos or videos; and generating the first risk metric of the plurality of risk metrics corresponding to the first feature based on providing the estimated light direction, the user location, and the timestamp to the first risk determination model.

8. The method of any one of the preceding embodiments, wherein generating the plurality of risk metrics for the user further comprises: determining that a first feature of the one or more features includes a background object, wherein the background object is a non-user object in a photo or video of the one or more media recordings; transmitting a metadata request to the user device, wherein the metadata request requests location information and time information for the user device; in response to the metadata request, receiving a user location and a timestamp from the user device; determining a first risk determination model, wherein the first risk determination model is associated with background objects in photos or videos; and generating a first risk metric of the plurality of risk metrics corresponding to the first feature based on providing the user location, the timestamp, and an indication of the background object into the first risk determination model.

9. The method of any one of the preceding embodiments, wherein generating the plurality of risk metrics for the user further comprises: determining that a first feature of the one or more features includes a first image of a first background object in a first media recording of the one or more media recordings; determining that a second feature of the one or more features includes a second image of a second background object in a second media recording of the one or more media recordings; determining a degree of consistency between the first image and the second image, wherein the degree of consistency indicates a likelihood that the first background object and the second background object are associated with a common object; and generating a first risk metric of the plurality of risk metrics based on the degree of consistency.

10. The method of any one of the preceding embodiments, wherein generating the plurality of risk metrics for the user further comprises: determining that a first feature of the one or more features includes a first background noise in a first audio recording of the one or more media recordings; determining that a second feature of the one or more features includes a second background noise in a second audio recording of the one or more media recordings; determining a degree of consistency between the first background noise and the second background noise, wherein the degree of consistency indicates a likelihood that the user device is in a similar audio environment during the first audio recording and the second audio recording; and generating a first risk metric of the plurality of risk metrics based on the degree of consistency.

11. The method of any one of the preceding embodiments, further comprising: transmitting the user verification request to the user device to include a request for at least one voice recording of the user and for at least one digital photo of the user, wherein the user verification request includes a request for permission to record audio from the user device for a first period of time comprising a second period of time and a third period of time; determining that the one or more media recordings include a voice recording and a digital photo, wherein the voice recording includes first audio content from the second period of time, wherein the digital photo is associated with second audio content of the voice recording, and wherein the digital photo and the second audio content were captured by the user device during the third period of time; and detecting at least one background noise feature in the first audio content or the second audio content, wherein the at least one background noise feature is associated with a risk factor for user authentication.

12. The method of any one of the preceding embodiments, wherein generating the plurality of risk metrics for the user comprises: generating a first risk metric for the user based on providing the voice recording to a first risk determination model, wherein the first risk determination model is associated with background noises in audio recordings; generating a second risk metric for the user based on providing the digital photo to a second risk determination model, wherein the second risk determination model is associated with background objects; and determining the authentication probability based on inputting the first risk metric and the second risk metric into an authentication determination model.

13. The method of any one of the preceding embodiments, wherein generating the plurality of risk metrics for the user comprises: extracting a plurality of frames from a digital video of the one or more media recordings; determining a plurality of indications of background objects within the plurality of frames; determining that a subset of the plurality of indications of background objects is included in more than one frame of the plurality of frames; and based on determining that the subset is included in the more than one frame of the plurality of frames, generating a first risk metric of the plurality of risk metrics.

14. The method of any one of the preceding embodiments, wherein generating the plurality of risk metrics for the user comprises: determining that the one or more media recordings includes accelerometer data for the user device; determining a first user device orientation based on the accelerometer data; determining a first risk determination model, wherein the first risk determination model is associated with device orientations; and based on providing the first user device orientation into the first risk determination model, generating a first risk metric of the plurality of risk metrics.

15. The method of any one of the preceding embodiments, further comprising: determining that the one or more media recordings include a digital image of the user; determining a second user device orientation based on a perspective associated with the digital image; and generating a second risk metric of the plurality of risk metrics based on comparing the first user device orientation and the second user device orientation.

16. The method of any one of the preceding embodiments, further comprising: determining that the one or more media recordings include one or more digital images of the user; determining a set of visual differences between a first digital image and a second digital image, wherein the one or more digital images comprise the first digital image and the second digital image; and based on providing the set of visual differences between the first digital image and the second digital image to a first risk determination model, generating a first risk metric of the plurality of risk metrics.

17. The method of any one of the preceding embodiments, further comprising: generating the user verification request to include a pose request, wherein the pose request indicates a physical pose to be performed by the user; determining that the one or more media recordings include a digital photo or a digital video including the user performing an approximation of the physical pose; and based on providing the pose request and the digital photo or the digital video to a first risk determination model corresponding to user poses, generating a first risk metric of the plurality of risk metrics.

18. One or more non-transitory, computer-readable media storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

21. A system comprising cloud-based circuitry for performing any of embodiments 1-17.

What is claimed is:

1. A system for authenticating users based on digital media-based security factors, the system comprising:
   one or more processors; and
   one or more non-transitory, computer-readable media storing instructions that, when executed by the one or more processors, cause operations comprising:
      receiving, from a user device associated with a user, an authentication request, wherein the user device is configured to record photo, video and audio content associated with the user;
      transmitting a user verification request to the user device based on the authentication request, wherein the user verification request indicates a request for at least one voice recording of the user and for at least one digital photo of the user;
      receiving, from the user device, a voice recording and a digital photo, wherein the voice recording includes first audio content from a first period of time, wherein the digital photo is associated with second audio content, and wherein the digital photo and the second audio content were captured during a second period of time;
      detecting at least one background noise feature in the first audio content or the second audio content, wherein the at least one background noise feature is associated with a risk factor for user authentication;
      determining a first risk determination model from a plurality of risk determination models, wherein the first risk determination model is configured to evaluate authentication risk factors based on background noise features;
      generating a first risk metric for the user in response to providing the first audio content and the second audio content to the first risk determination model;
      determining an authentication probability based on the first risk metric, the authentication probability indicating a likelihood that the voice recording and the digital photo correspond to the user;
      determining whether the authentication probability is greater than a threshold probability; and
      generating, for display on the user device, an authentication message indicating a user authentication status based on determining that the authentication probability is greater than the threshold probability.

2. A method for authenticating users based on digital media-based security factors, comprising:
receiving, from a user device associated with a user, an authentication request, wherein the user device is configured to record media content associated with the user;
based on the authentication request, transmitting a user verification request to the user device, wherein the user verification request indicates a request for media recordings of the user;
receiving one or more media recordings from the user device in response to the user verification request;
detecting one or more features in the one or more media recordings, wherein each feature of the one or more features is associated with a corresponding risk factor for user authentication;
generating a plurality of risk metrics for the user, wherein generating each risk metric of the plurality of risk metrics comprises:
determining a corresponding risk determination model for a corresponding feature of the one or more features, and
generating a corresponding risk metric for the user based on providing the one or more media recordings to the corresponding risk determination model for the corresponding feature; and
determining an authentication probability based on the plurality of risk metrics, the authentication probability indicating a likelihood that the one or more media recordings correspond to the user.

3. The method of claim 2, wherein determining the corresponding risk determination model for the corresponding feature of the one or more features comprises:
generating a corresponding feature classification, wherein the corresponding feature classification indicates a corresponding type of the corresponding feature;
retrieving a plurality of model identifiers from a model database, wherein each model identifier of the plurality of model identifiers identifies an associated risk determination model and an associated model classification, and wherein the associated model classification indicates an associated input feature type for the associated risk determination model;
identifying a match between the corresponding feature classification for the corresponding feature and a model classification associated with the plurality of model identifiers; and
based on identifying the match, determining the corresponding risk determination model based on a first model identifier associated with the model classification.

4. The method of claim 3, wherein determining the authentication probability based on the plurality of risk metrics comprises:
determining a plurality of model classifications corresponding to the plurality of risk metrics, wherein each model classification of the plurality of model classifications is associated with the corresponding risk determination model for the corresponding risk metric; and
based on providing the plurality of model classifications and the plurality of risk metrics to an authentication determination model, generating the authentication probability.

5. The method of claim 2, wherein generating the plurality of risk metrics further comprises:
determining that a first feature of the one or more features includes an indication of a light in the one or more media recordings;
based on the indication of the light, determining an estimated light direction, wherein the estimated light direction indicates a direction of a source of the light in relation to the user device;
transmitting a metadata request to the user device, wherein the metadata request requests location information and time information for the user device;
in response to the metadata request, receiving a user location and a timestamp from the user device;
generating an expected light direction based on the user location and the timestamp; and
determining a first risk metric of the plurality of risk metrics corresponding to the first feature based on the expected light direction and the estimated light direction.

6. The method of claim 5, further comprising:
determining a first risk determination model, wherein the first risk determination model is associated with light directions in photos or videos; and
generating the first risk metric of the plurality of risk metrics corresponding to the first feature based on providing the estimated light direction, the user location, and the timestamp to the first risk determination model.

7. The method of claim 2, wherein generating the plurality of risk metrics for the user further comprises:
determining that a first feature of the one or more features includes a background object, wherein the background object is a non-user object in a photo or video of the one or more media recordings;
transmitting a metadata request to the user device, wherein the metadata request requests location information and time information for the user device;
in response to the metadata request, receiving a user location and a timestamp from the user device;
determining a first risk determination model, wherein the first risk determination model is associated with background objects in photos or videos; and
generating a first risk metric of the plurality of risk metrics corresponding to the first feature based on providing the user location, the timestamp, and an indication of the background object into the first risk determination model.

8. The method of claim 2, wherein generating the plurality of risk metrics for the user further comprises:
determining that a first feature of the one or more features includes a first image of a first background object in a first media recording of the one or more media recordings;
determining that a second feature of the one or more features includes a second image of a second background object in a second media recording of the one or more media recordings;
determining a degree of consistency between the first image and the second image, wherein the degree of consistency indicates a likelihood that the first background object and the second background object are associated with a common object; and
generating a first risk metric of the plurality of risk metrics based on the degree of consistency.

9. The method of claim 2, wherein generating the plurality of risk metrics for the user further comprises:
   determining that a first feature of the one or more features includes a first background noise in a first audio recording of the one or more media recordings;
   determining that a second feature of the one or more features includes a second background noise in a second audio recording of the one or more media recordings;
   determining a degree of consistency between the first background noise and the second background noise, wherein the degree of consistency indicates a likelihood that the user device is in a similar audio environment during the first audio recording and the second audio recording; and
   generating a first risk metric of the plurality of risk metrics based on the degree of consistency.

10. The method of claim 2, further comprising:
   transmitting the user verification request to the user device to include a request for at least one voice recording of the user and for at least one digital photo of the user, wherein the user verification request includes a request for permission to record audio from the user device for a first period of time comprising a second period of time and a third period of time;
   determining that the one or more media recordings include a voice recording and a digital photo, wherein the voice recording includes first audio content from the second period of time, wherein the digital photo is associated with second audio content of the voice recording, and wherein the digital photo and the second audio content were captured by the user device during the third period of time; and
   detecting at least one background noise feature in the first audio content or the second audio content, wherein the at least one background noise feature is associated with a risk factor for user authentication.

11. The method of claim 10, wherein generating the plurality of risk metrics for the user comprises:
   generating a first risk metric for the user based on providing the voice recording to a first risk determination model, wherein the first risk determination model is associated with background noises in audio recordings;
   generating a second risk metric for the user based on providing the digital photo to a second risk determination model, wherein the second risk determination model is associated with background objects; and
   determining the authentication probability based on inputting the first risk metric and the second risk metric into an authentication determination model.

12. The method of claim 2, wherein generating the plurality of risk metrics for the user comprises:
   extracting a plurality of frames from a digital video of the one or more media recordings;
   determining a plurality of indications of background objects within the plurality of frames;
   determining that a subset of the plurality of indications of background objects is included in more than one frame of the plurality of frames; and
   based on determining that the subset is included in the more than one frame of the plurality of frames, generating a first risk metric of the plurality of risk metrics.

13. The method of claim 2, wherein generating the plurality of risk metrics for the user comprises:
   determining that the one or more media recordings includes accelerometer data for the user device;
   determining a first user device orientation based on the accelerometer data;
   determining a first risk determination model, wherein the first risk determination model is associated with device orientations; and
   based on providing the first user device orientation into the first risk determination model, generating a first risk metric of the plurality of risk metrics.

14. The method of claim 13, further comprising:
   determining that the one or more media recordings include a digital image of the user;
   determining a second user device orientation based on a perspective associated with the digital image; and
   generating a second risk metric of the plurality of risk metrics based on comparing the first user device orientation and the second user device orientation.

15. The method of claim 2, further comprising:
   determining that the one or more media recordings include one or more digital images of the user;
   determining a set of visual differences between a first digital image and a second digital image, wherein the one or more digital images comprise the first digital image and the second digital image; and
   based on providing the set of visual differences between the first digital image and the second digital image to a first risk determination model, generating a first risk metric of the plurality of risk metrics.

16. The method of claim 2, further comprising:
   generating the user verification request to include a pose request, wherein the pose request indicates a physical pose to be performed by the user;
   determining that the one or more media recordings include a digital photo or a digital video including the user performing an approximation of the physical pose; and
   based on providing the pose request and the digital photo or the digital video to a first risk determination model corresponding to user poses, generating a first risk metric of the plurality of risk metrics.

17. One or more non-transitory, computer-readable media storing instructions that, when executed by one or more processors, cause operations comprising:
   receiving, from a user device associated with a user, an authentication request, wherein the user device is configured to record media content associated with the user;
   based on the authentication request, transmitting a user verification request to the user device, wherein the user verification request indicates a request for media recordings of the user;
   receiving one or more media recordings from the user device in response to the user verification request;
   detecting one or more features in the one or more media recordings, wherein each feature of the one or more features is associated with a corresponding risk factor for user authentication;
   generating a plurality of risk metrics for the user, wherein generating each risk metric of the plurality of risk metrics comprises:
      determining a corresponding risk determination model for a corresponding feature of the one or more features, and
      generating a corresponding risk metric for the user based on providing the one or more media recordings to the corresponding risk determination model for the corresponding feature; and generating an authentication probability based on providing the plurality of risk metrics to an authentication determination model, the authentication probability indicating a likelihood that the one or more media recordings correspond to the user.

18. The one or more non-transitory, computer-readable media of claim 17, wherein the instructions for determining the corresponding risk determination model for the corresponding feature of the one or more features cause operations comprising:
generating a corresponding feature classification, wherein the corresponding feature classification indicates a corresponding type of the corresponding feature;
retrieving a plurality of model identifiers from a model database, wherein each model identifier of the plurality of model identifiers identifies an associated risk determination model and an associated model classification, and wherein the associated model classification indicates an associated input feature type for the associated risk determination model;
identifying a match between the corresponding feature classification for the corresponding feature and a model classification associated with the plurality of model identifiers; and
based on identifying the match, determining the corresponding risk determination model based on a first model identifier associated with the model classification.

19. The one or more non-transitory, computer-readable media of claim 17, wherein the instructions for generating the plurality of risk metrics cause operations comprising:
determining that a first feature of the one or more features includes an indication of a light in the one or more media recordings;
based on the indication of the light, determining an estimated light direction, wherein the estimated light direction indicates a direction of a source of the light in relation to the user device;
transmitting a metadata request to the user device, wherein the metadata request requests location information and time information for the user device;
in response to the metadata request, receiving a user location and a timestamp from the user device;
generating an expected light direction based on the user location and the timestamp; and
determining a first risk metric of the plurality of risk metrics corresponding to the first feature based on the expected light direction and the estimated light direction.

20. The one or more non-transitory, computer-readable media of claim 17, wherein generating the plurality of risk metrics, for the user, cause operations comprising:
determining that a first feature of the one or more features includes a first image of a first background object in a first media recording of the one or more media recordings;
determining that a second feature of the one or more features includes a second image of a second background object in a second media recording of the one or more media recordings;
determining a degree of consistency between the first image and the second image, wherein the degree of consistency indicates a likelihood that the first background object and the second background object are associated with a common object; and
generating a first risk metric of the plurality of risk metrics based on the degree of consistency.

\* \* \* \* \*